United States Patent
Park et al.

(10) Patent No.: US 12,204,498 B2
(45) Date of Patent: Jan. 21, 2025

(54) METHOD FOR OBJECT MANAGEMENT USING TRACE IDENTIFIER

(71) Applicant: FASOO CO., LTD, Seoul (KR)

(72) Inventors: Chel Park, Seoul (KR); Tae Sang Kim, Seoul (KR); Hyung Dong Yoon, Goyang-si (KR); Jin Seok Um, Seoul (KR)

(73) Assignee: FASOO CO., LTD, Seoul (KR)

( * ) Notice: Subject to any disclaimer, the term of this patent is extended or adjusted under 35 U.S.C. 154(b) by 93 days.

(21) Appl. No.: 17/253,465

(22) PCT Filed: Jun. 17, 2019

(86) PCT No.: PCT/KR2019/007288
§ 371 (c)(1),
(2) Date: Dec. 17, 2020

(87) PCT Pub. No.: WO2019/245247
PCT Pub. Date: Dec. 26, 2019

(65) Prior Publication Data
US 2021/0255998 A1    Aug. 19, 2021

(30) Foreign Application Priority Data
Jun. 20, 2018   (KR) .................. 10-2018-0070910

(51) Int. Cl.
*G06F 16/18*    (2019.01)
*G06F 16/17*    (2019.01)
(Continued)

(52) U.S. Cl.
CPC ...... *G06F 16/1873* (2019.01); *G06F 16/1734* (2019.01); *G06F 16/183* (2019.01); *G06F 16/219* (2019.01)

(58) Field of Classification Search
CPC ............. G06F 16/1873; G06F 16/1734; G06F 16/183; G06F 16/219; G06F 21/16; G06F 16/93

See application file for complete search history.

(56) References Cited

U.S. PATENT DOCUMENTS

| 11,182,372 B1 * | 11/2021 | Jain ................... G06F 11/1464 |
| 2006/0136513 A1 * | 6/2006 | Ngo ...................... G06Q 10/10 |
| | | 707/999.203 |

(Continued)

FOREIGN PATENT DOCUMENTS

| JP | H 08101827 A | 4/1996 |
| JP | 2001189706 A | 7/2001 |

(Continued)

OTHER PUBLICATIONS fasoo.com Co. Ltd., International Search Report and Written Opinion, PCT/KR2019/007288, Sep. 25, 2019, 11 pgs.

(Continued)

*Primary Examiner* — Pierre M Vital
*Assistant Examiner* — Andrew N Ho
(74) *Attorney, Agent, or Firm* — Morgan, Lewis & Bockius LLP

(57) ABSTRACT

The present disclosure relates to a method for managing an object, an apparatus for the same, a computer program for the same, and a recording medium storing computer program thereof. A method for managing an object using a trace-identifier (T-ID) according to the present disclosure may comprise: updating T-ID information for the object at a timepoint at which the object is saved after the object is opened at an endpoint; writing the updated T-ID information as metadata of the object; and transmitting the metadata including the T-ID information to a server.

16 Claims, 9 Drawing Sheets

(51) Int. Cl.
*G06F 16/182* (2019.01)
*G06F 16/21* (2019.01)

(56) References Cited

U.S. PATENT DOCUMENTS

| | | | | |
|---|---|---|---|---|
| 2008/0195677 | A1* | 8/2008 | Sudhakar | G06F 16/1873 |
| 2008/0215546 | A1* | 9/2008 | Baum | G06F 16/24578 |
| 2009/0044283 | A1* | 2/2009 | Yoshihama | G06F 16/93 |
| | | | | 726/28 |
| 2009/0125472 | A1* | 5/2009 | Houchi | G06F 16/93 |
| | | | | 706/50 |
| 2010/0138420 | A1* | 6/2010 | Bator | G06F 16/40 |
| | | | | 707/737 |
| 2013/0290248 | A1* | 10/2013 | Fukatani | G06F 16/184 |
| | | | | 707/610 |
| 2014/0019455 | A1* | 1/2014 | Cochrane | G06T 11/206 |
| | | | | 715/810 |
| 2014/0201148 | A1* | 7/2014 | Doui | G06F 16/93 |
| | | | | 707/638 |
| 2014/0365479 | A1* | 12/2014 | Lyons | G06F 3/0482 |
| | | | | 707/725 |
| 2016/0012082 | A1* | 1/2016 | Choudhury | G06F 16/447 |
| | | | | 707/692 |
| 2016/0170571 | A1* | 6/2016 | Hoshino | H04L 12/1813 |
| | | | | 348/14.03 |
| 2018/0067910 | A1* | 3/2018 | Alonso | H04L 67/306 |
| 2018/0314680 | A1* | 11/2018 | Dorai | G06F 40/166 |

FOREIGN PATENT DOCUMENTS

| | | |
|---|---|---|
| JP | 2008515111 A | 5/2008 |
| JP | 2008181350 A | 8/2008 |
| JP | 2012173780 A | 9/2012 |
| JP | 2015515034 A | 5/2015 |
| JP | 2016526208 A | 9/2016 |
| JP | 2017191397 A | 10/2017 |
| KR | 20090003542 | 1/2009 |
| KR | 20110091544 A | 8/2011 |
| WO | WO-2015020600 A1 * | 2/2015 ......... G06F 11/1451 |

OTHER PUBLICATIONS

Fasoo Co., Ltd., Korean Office Action, KR Application No. 10-20180070910, Jul. 31, 2020, 9 pgs.
Japanese Patent Application No. 2021-520891, Office Action, Jan. 25, 2022, 6 pgs.

* cited by examiner

[Fig. 6]
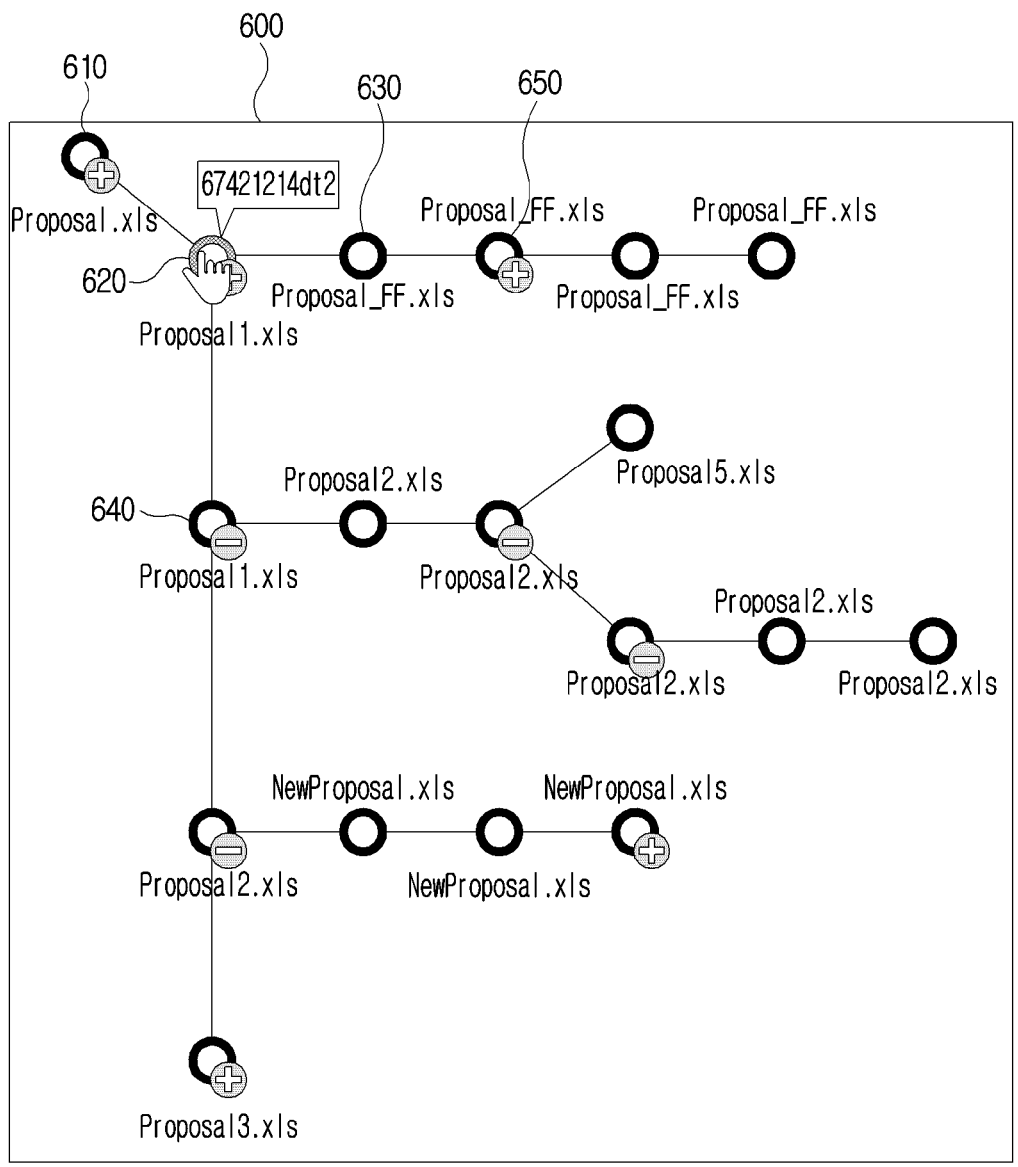

[Fig. 7]
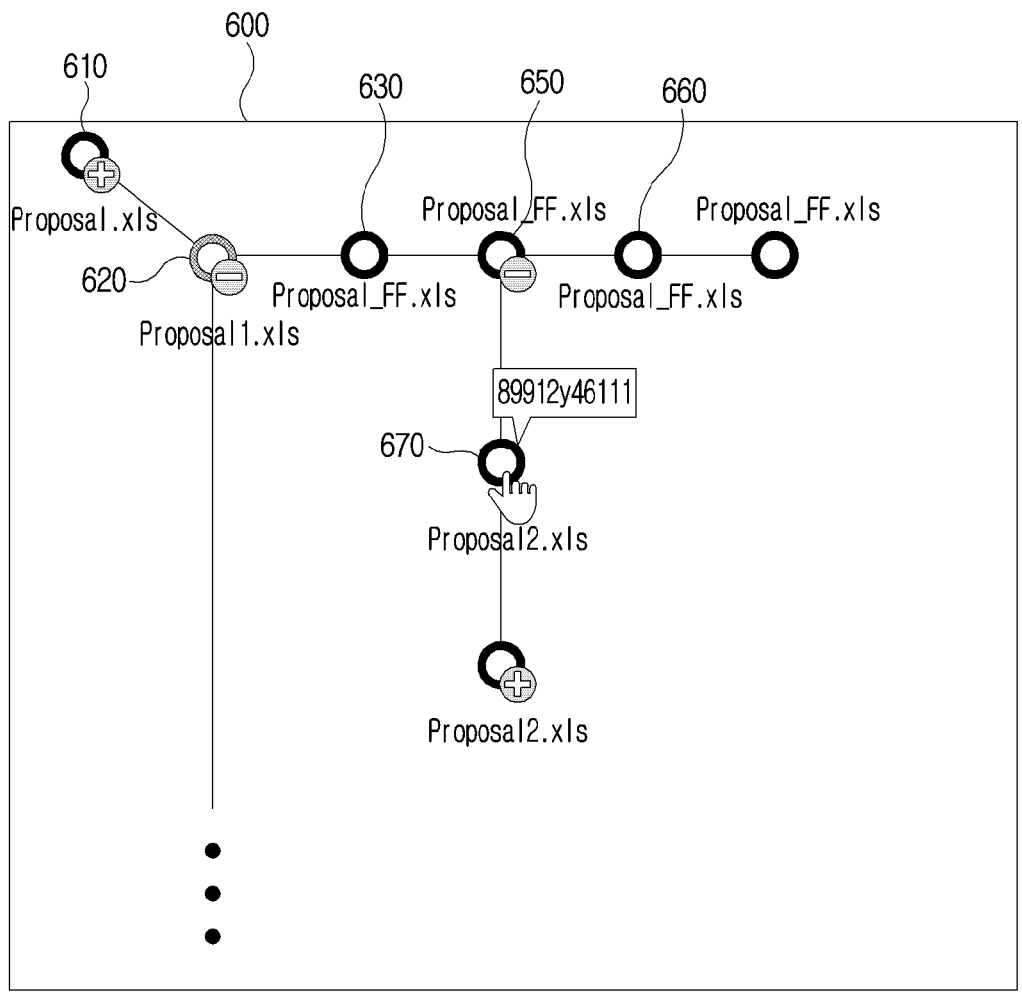

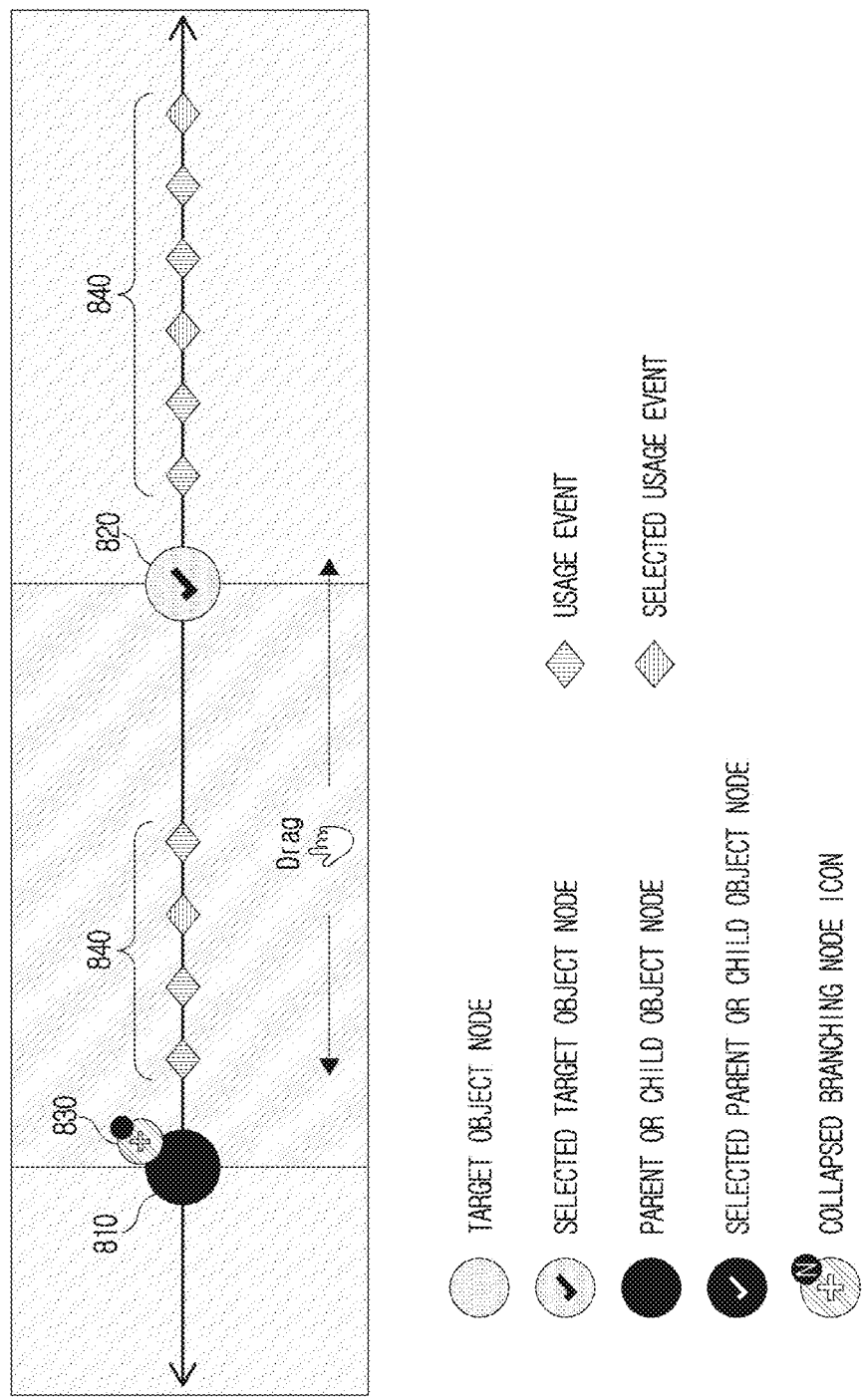

[Fig. 9]
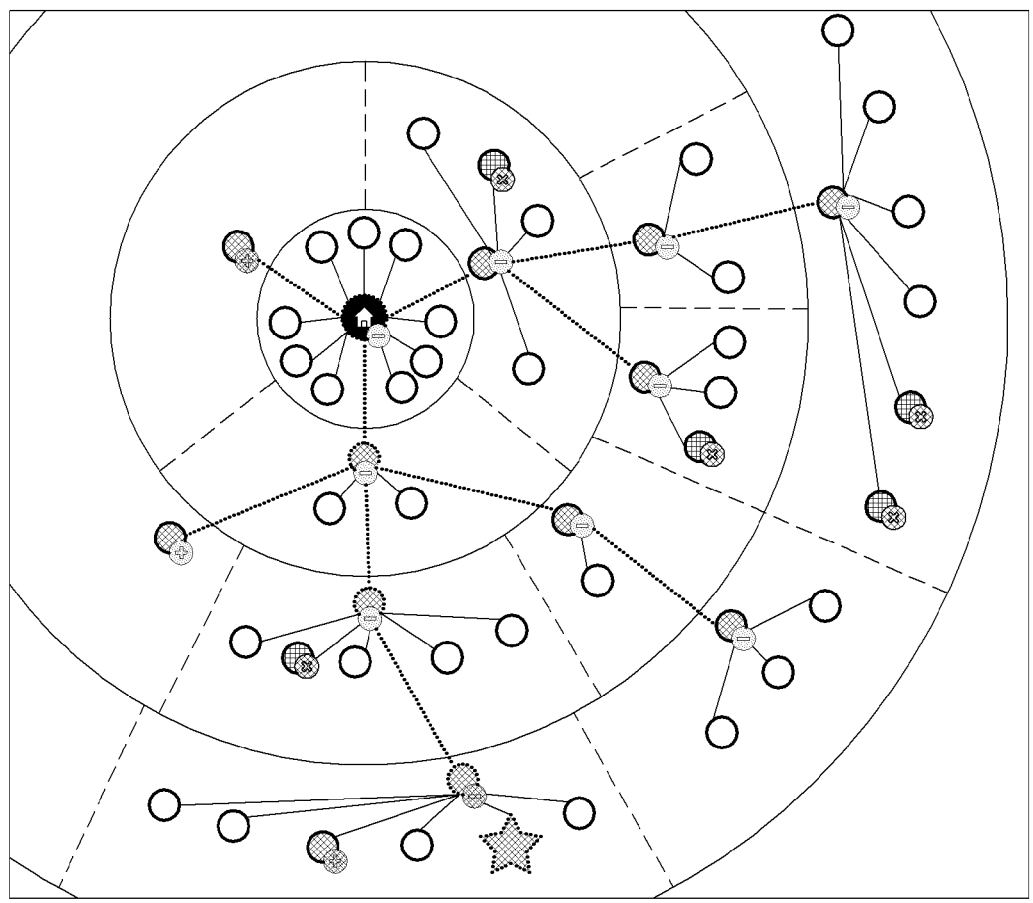
 ROOT OBJECT NODE    TARGET OBJECT NODE

METHOD FOR OBJECT MANAGEMENT USING TRACE IDENTIFIER

CROSS-REFERENCE TO RELATED APPLICATIONS

This application is the National Stage filing under 35 U.S.C. 371 of International Application No. PCT/KR2019/007288, filed on Jun. 17, 2019, which claims the benefit of Korean Patent Application No. 10-2018-0070910, filed on Jun. 20, 2018, the contents of both of which are all hereby incorporated by reference herein in their entirety.

TECHNICAL FIELD

The present disclosure relates to a method for managing an object, an apparatus for the same, a computer program for the same, and a recording medium storing computer program thereof, and more particularly to a method for tracing and managing a content change history or a copy creation history of an object using a trace identifier, an apparatus for the same, a computer program for the same, and a recording medium storing computer program thereof.

BACKGROUND ART

With the development of a computing environment, an object such as an electronic document file may be easily distributed among a plurality of users. For example, after a document is created and distributed by one of the members of an organization, the distributed document may be changed, transferred, or shared across a number of members.

In such a document distribution environment, a unique identifier may be assigned to a document in order to trace a content change history of the document. However, when a copy of a document is created, the document identifier of the original and the copy are the same, so it may not be confirmed whether content of the original and the copy are changed only by the document identifier. In this case, it may be estimated whether the content has been changed by comparing the file sizes of the document copies having the same document identifier, but it may not be determined which document is a copy of which document and in which order the content of the document is changed.

Accordingly, there is a need for a method of tracing a content change history or a copy creation history of an object including content, such as an electronic document file.

DISCLOSURE OF INVENTION

Technical Problem

It is a technical object of the present disclosure to provide a method and an apparatus for managing an object using a trace identifier.

It is an additional technical object of the present disclosure to provide a method and an apparatus for tracing an object based on relationship information among objects using a trace identifier.

The technical objects to be achieved by the present disclosure are not limited to the technical matters mentioned above, and other technical objects not mentioned are to be clearly understood by those skilled in the art from the following description.

Solution to Problem

According to an aspect of the present disclosure, a method for managing an object using a trace-identifier (T-ID) may comprise: updating T-ID information for the object at a timepoint at which the object is saved after the object is opened at an endpoint; writing the updated T-ID information as metadata of the object; and transmitting the metadata including the T-ID information to a server.

According to an additional aspect of the present disclosure, a method for tracing an object using a trace-identifier (T-ID) may comprise: receiving, at an endpoint from a server, relationship information indicating relationship among one or more objects based on T-ID information of each of the one or more objects, for an object group including the one or more objects assigned a common C-ID; and displaying, at the endpoint, relationship among the one or more objects based on the relationship information, wherein T-ID information for an object is updated at a timepoint at which the object is saved after the object is opened at the endpoint or at one or more other endpoints, and metadata including the updated T-ID information is transmitted to the server.

According to an additional aspect of the present disclosure, a method for managing an object using a trace-identifier (T-ID) may comprise: receiving, at a server from one or more endpoints, metadata including T-ID information for each of one or more objects; and generating information indicating relationship among the one or more objects based on the T-ID information for the each of the one or more objects, for an object group including the one or more objects, and transmitting the generated information to the one or more endpoints or one or more other endpoints, wherein, for the T-ID information for the each of the one or more objects, T-ID information for an object is updated, regardless of whether content of the object is changed, at a timepoint at which the object is saved after the object is opened at an endpoint, and the updated T-ID information is written as metadata for the object.

It is to be understood that the foregoing summarized features are exemplary aspects of the following detailed description of the present disclosure and are not intended to limit the scope of the present disclosure.

Advantageous Effects of Invention

According to the present disclosure, a method and an apparatus for managing an object using a trace identifier may be provided.

According to the present disclosure, a method and an apparatus for tracing an object based on relationship information among objects using a trace identifier may be provided.

According to the present disclosure, by using a trace identifier that is updated when an object is changed/stored, without personally recording an intention of changing or saving the object or a relationship with another object by a user, object traceability of tracing a relationship among objects according to a content change history or a copy creation history of an object in a simple manner may be provided.

According to the present disclosure, relationship information among objects may be managed by collecting metadata including trace identifier information at a server, a relationship among objects may be displayed based on the relationship information at an endpoint, so that a change of an object, a leakage route of an object, or the like may be easily grasped from a relationship among objects in a linear section or a branch section.

The advantages of the present disclosure are not limited to the foregoing descriptions, and additional advantages will

BRIEF DESCRIPTION OF DRAWINGS

FIGS. 6 and 7 are diagrams illustrating an example of an object tracing scenario according to the present disclosure.

FIGS. 8 and 9 are diagrams illustrating additional examples of displaying object relationship according to the present disclosure.

BEST MODE FOR CARRYING OUT THE INVENTION

Figure 1:
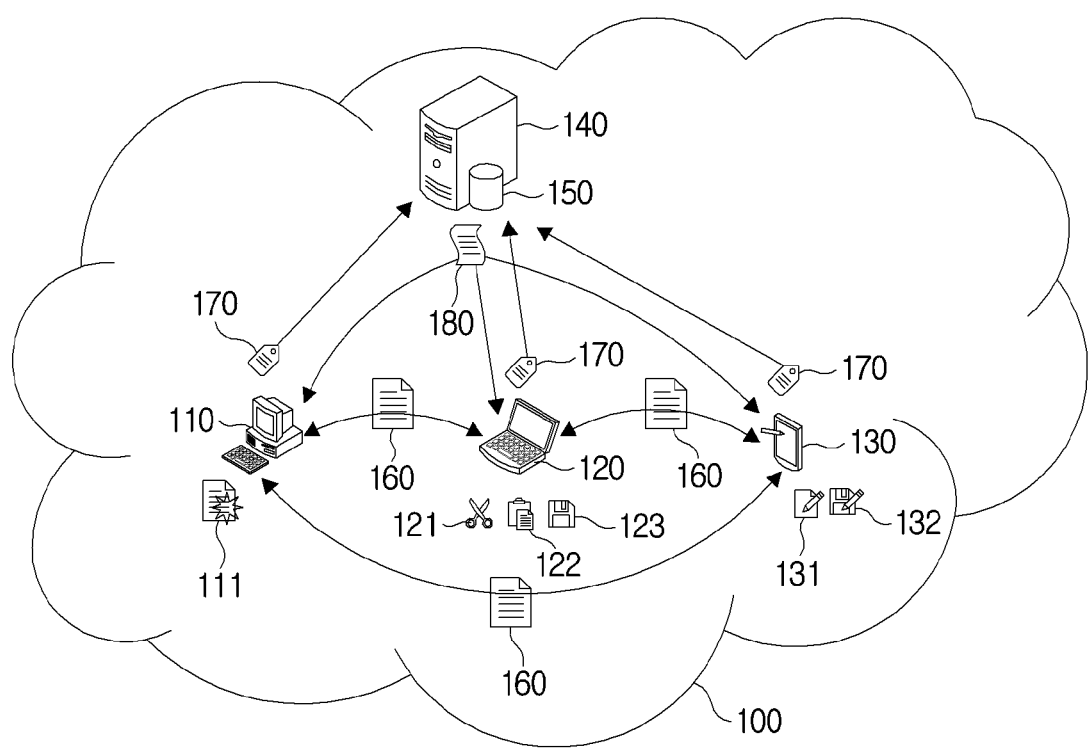
FIG. 1 is a diagram illustrating a system to which the present disclosure may be applied.

Hereinafter, embodiments of the present invention will be described in detail so that those skilled in the art can easily carry out the present invention referring to the ac-companying drawings. However, the present disclosure may be embodied in many different forms and is not limited to the embodiments described herein.

In the following description of the embodiments of the present invention, a detailed description of known functions and configurations incorporated herein will be omitted when it may make the subject matter of the present disclosure unclear. Parts not related to the description of the present disclosure in the drawings are omitted, and similar parts are denoted by similar reference numerals.

In the present disclosure, when an element is referred to as being "connected", "coupled", or "accessed" to another element, it is understood to include not only a direct connection relationship but also an indirect connection relationship. Also, when an element is referred to as "containing" or "having" another element, it means not only excluding another element but also further including another element.

In the present disclosure, the terms "first", "second", and so on are used only for the purpose of distinguishing one element from another, and do not limit the order or importance of the elements unless specifically mentioned. Thus, within the scope of this disclosure, the first component in one embodiment may be referred to as a second component in another embodiment, and similarly a second component in one embodiment may be referred to as a second component in another embodiment.

In the present disclosure, components that are distinguished from one another are intended to clearly illustrate each feature and do not necessarily mean that components are separate. That is, a plurality of components may be integrated into one hardware or software unit, or a single component may be distributed into a plurality of hardware or software units. Accordingly, such integrated or distributed embodiments are also included within the scope of the present disclosure, unless otherwise noted.

In the present disclosure, the components described in the various embodiments do not necessarily mean essential components, but some may be optional components. Accordingly, embodiments consisting of a subset of the components described in one embodiment are also included within the scope of this disclosure. Also, embodiments that include other components in addition to the components described in the various embodiments are also included in the scope of the present disclosure.

The definitions of the terms used in the present disclosure are as follows.

Object is a unit of a processing operation such as create, open, close, delete, edit, save, save-as, copy, paste, rename, or the like. An object may include various contents such as document, image, video, audio, multimedia, or the like. For example, an object may correspond to an electronic file in a computer system.

Content-Identifier (C-ID) is an identifier assigned as a new value when an object is initially created. C-ID is not changed when editing content of an object, creating a copy of an object, saving an object as another name, or renaming an object, but a previously assigned C-ID is maintained.

Trace-Identifier (T-ID) is an identifier defined for identifying a content change history or a copy creation history of an object. T-ID may be updated when changing content of an object, saving an object, or saving an object after changing content of an object. T-ID may be defined as a pair of a parent T-ID and a current T-ID.

Traceability is a capability for estimating a content change history of an object, a copy creation history of an object, transfer route of an object, leakage route of an object, or the like, using T-ID of the present disclosure.

Server is a device capable of creating, storing, maintaining, managing, providing an object and/or information (e.g., metadata) related to an object.

Endpoint is a device capable of performing a processing operation on an object, a search and an inquiry for an object. For example, an endpoint may correspond to a personal computer (PC), notebook computer, smartphone, tablet computer, or the like. Unless specifically noted in the present disclosure, the term "endpoint" may be replaced by the term "user," or a processing operation on an object may be performed by a machine at an endpoint even if there is no direct manipulation by a user.

Metadata is additional information related to an object. Metadata may be created, stored, and updated distinguishably from content data of an object. For example, if an object includes a header and a body, content data may be included in the body, and metadata may be included in the header.

Hereinafter, a method for object management to provide traceability, an apparatus for the same, a computer program for the same, and a recording medium storing computer program thereof according to the present disclosure will be described.

As an example of an object management method, a document management solution will be described. A document management solution may provide a function of identifying a content change history of a document by assigning a unique document identifier (e.g., C-ID) to the document.

It is assumed that a physical file A to which a specific document identifier is assigned is copied as a physical file B through a file manager (e.g., Windows Explorer), and then the contents of the files A and B are individually revised. In this case, since the files A and B have the same document identifier, it may not be distinguished whether the files A and B are the same document or different documents.

In order to complement the deficiencies of a method of identifying a content change history of a document using a document identifier, a method of identifying a document further using a file name, physical path, disk location, or the like, may be used. Using such additional information merely allows identifying whether the files are physically different, but it may not be identified whether the contents included in the files are changed actually.

In addition, a file size may be used to identify whether content of a document has been changed. In this case, if the physical files A and B have different file sizes, they may be estimated as having different contents. However, if the contents of the files A and B are different from each other but the file sizes are the same with each other by chance, it may not be distinguished whether the contents are changed. In other words, even if the file sizes are the same, it may not be confirmed that the contents are not changed.

In addition, it is assumed that any one of files A and B is copied as file C through a file manager, and then content of the file C is changed. In this case, all of physical files A, B and C have the same document identifier, and it may be estimated that each of files A, B and C has different content from each other when the file sizes of A, B and C are different from each other, but it may not be identified whether the file C is copied from file A and changed or the file C is copied from file B and changed. That is, even if the file size is considered, a copy creation history of a document may not be identified.

In addition, the following scenario may be assumed. After user X creates a document file A0, the user X inputs content in the file A0 and saves it. The user X attaches the file A0 to e-mail and sends it to user Y. The user Y downloads the file A0 and saves it as file A1 (i.e., the file A1 contains the same content as the file A0 but is physically different from A0) in an endpoint. The user Y changes some contents of file A1 and saves it. The user Y sends the changed file A1 to user X via e-mail. The user X downloads the file A1 changed by the user Y to a temporary folder of an endpoint and saves it as file A2, copies the file A2 to another folder and saves it as file A3. The user X changes some contents of the file A3 and saves it. The user X sends the changed file A3 to user Z through an electronic approval system.

In this scenario, the files A0, A1 and A2 are older versions of files that contain different content (i.e., content before change) from the final version of the file A3. The files A1 and A2 are physically different files, but their contents are the same without changes. Also, files A0, A1, A2 and A3 are documents having equivalent topics that contain consistent contents. However, in the document management solution using the C-ID, file name, physical path, disk location and file size, a relationship among documents (i.e., whether the content is changed, a content change history, whether the topic of content is changed, a copy creation history, or the like) may not be identified.

Therefore, a new method for object management is required to trace a content change history or a copy creation history of an object.

FIG. 1 is a diagram illustrating a system to which the present disclosure may be applied.

A system 100 shown in FIG. 1 may include one or more endpoints 110, 120 and 130, and a server 140. Each of the endpoints 110, 120 and 130 may be assigned to one or more users. For example, a first endpoint 110 or a third endpoint 130 may be assigned to one user, and a second endpoint 120 may be assigned to a plurality of users. The server 140 may be connected to a database 150 or may include the database 150. Various wired or wireless communication methods may be applied to data transmission and reception among the endpoints 110, 120 and 130, and data transmission and reception among the endpoints 110, 120 and 130 and the server 140.

Objects 160 may be distributed among the endpoints 110, 120 and 130 within the system 100. For example, a processing operation of create 111 an object in the first endpoint 110 may be performed, and the created object may be distributed to the second endpoint 120 and the third endpoint 130. A processing operation of cut 121, paste 122 or save 123 may be performed for content included in the object 160 at the second endpoint 120. A processing operation of edit 131 the content included in the object 160 or save the object 160 as a different name or location (save-as 132) may be performed in the third endpoint 130. Thus, the object 160 may be saved with its content changed or a copy of the object may be created across the endpoints 110, 120 and 130 in the system 100.

For example, the object 160 may be distributed across the endpoints 110, 120 and 130 via various media such as an e-mail, multimedia message, network drive, shared folder, cloud storage, portable storage (e.g., USB memory).

In the example of FIG. 1, a plurality of objects 160 are represented by a single reference numeral, but it is not limited to that the plurality of objects 160 include the same contents. That is, some objects may be copies containing exactly the same content, some or all of the content may be changed, added or deleted, or may be a new object created separately. In addition, some or all of the plurality of objects 160 may be objects having a common content-identifier (C-ID), or objects having different C-IDs.

According to the present disclosure, by updating a trace-identifier (T-ID) of the object 160 at each of endpoints 110, 120 and 130, a content change history or a copy creation history of the object 160, or the like may be managed in a simple manner. More specifically, T-ID may be updated when content of the object 160 is changed or the object 160 is saved at each of the endpoints 110, 120 and 130, and metadata 170 including the updated T-ID information may be transmitted to the server 140.

The server 140 may store and manage the metadata 170 received from each of the endpoints 110, 120 and 130 in the database 150.

According to the present disclosure, traceability may be provided for a content change history or a copy creation history of the object 160, based on the T-ID information included in the metadata 170. For example, the server 140 may receive metadata 170 including T-ID information for each of one or more objects belonging to an object group, and based thereon, may generate relationship information 180 indicating a relationship among one or more objects belonging to the object group. The relationship information 180 may be provided to an endpoint when a request is made by the endpoint 110, 120, 130, or may be provided to an endpoint according to a determination of the server 140 even if there is no request from the endpoint 110, 120, 130. The endpoints 110, 120, 130 provided with the relationship information 180 from the server 140 may determine and display the relationship among one or more objects belonging to the object group based on the relationship information 180.

For example, according to the present disclosure, for an object group including objects having the same C-ID, based on T-ID information of each of the objects, a content change history and/or a copy creation history of an object may be visually displayed. In addition, by displaying the relationships among the objects in this way, a content change history of an object, a final version of the object having an equivalent topic of the corresponding object, a copy creation history of an object, whether objects have topics equivalent to each other or different from each other, a leakage route of an object may be estimated.

According to the present disclosure, a plurality of object versions due to content changes of an object 160 or copies of objects may not be stored, maintained, or managed centrally by the server 140. That is, object traceability may be provided in a distributed manner as the server 140 manages only the metadata 170 related to the objects, and the objects 160 may be created, stored, and distributed in the endpoints 110, 120, 130.

The server-based object management system with storing and managing objects in the server 140 requires a mass storage and a complicated processing operation for synchronizing the changes when a plurality of users change objects by collaboration. Meanwhile, according to the present disclosure, the server 140 may not be required to store and manage the objects 160 or the content data of the objects 160 but may provide sufficient object traceability by storing and managing metadata 170 related to objects 160. Therefore, without a server-based object management system, object traceability may be provided for an environment where objects 160 freely distributed among the endpoints 110, 120, 130.

However, the various embodiments of the present disclosure do not preclude application to systems that store, maintain and manage the objects in the server 140. That is, embodiments providing object traceability using the T-ID according to the present disclosure may be applied to a case where the objects are stored, maintained and managed in the server 140.

Figure 2:
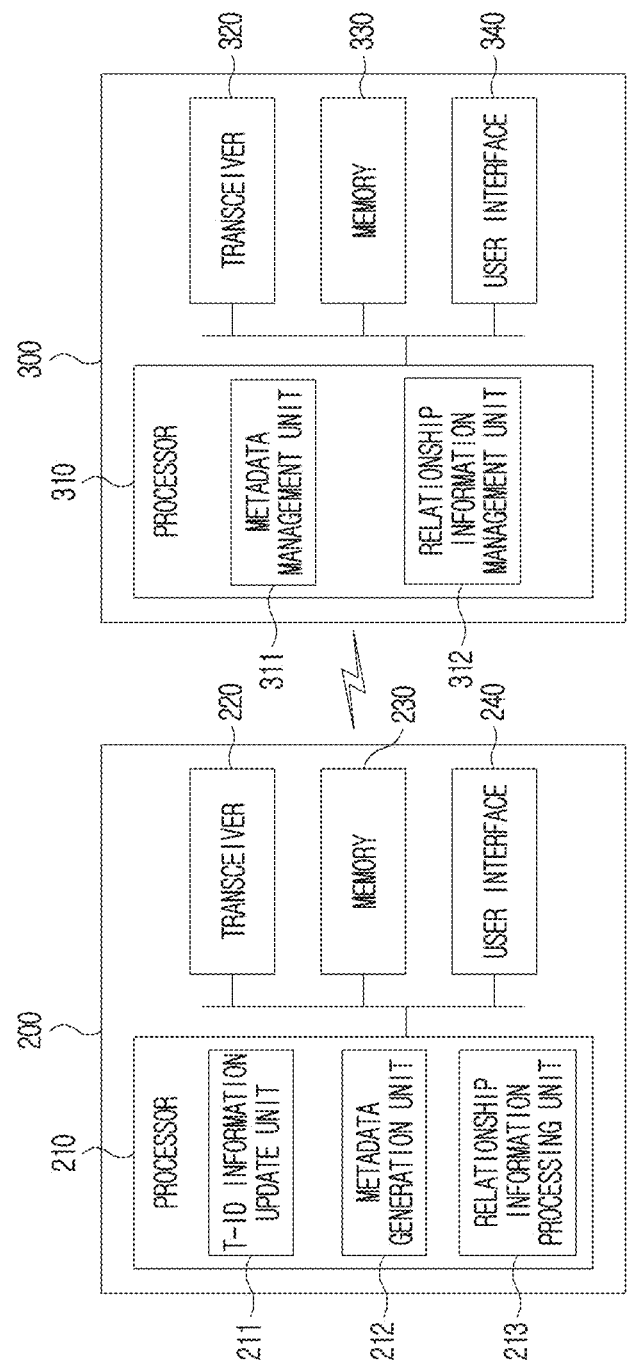
FIG. 2 is a diagram illustrating an endpoint apparatus and a server apparatus according to the present disclosure.

FIG. 2 is a diagram illustrating an endpoint apparatus and a server apparatus according to the present disclosure.

An endpoint apparatus 200 may include a processor 210, transceiver 220, memory 230 and user interface 240. The processor 210, transceiver 220, memory 230 and user interface 240 may transmit/receive data, request, response, command, or the like to/from each other through a bus or the like.

The processor 210 may control an operation of the transceiver 220, memory 230 and user interface 240. The processor 210 may perform a processing operation of create, open, close, delete, edit, save, save-as, copy, paste, rename, or the like for an object according to the present disclosure. In addition, the processor 210 may control overall operations of the endpoint apparatus 200 including other constituents of the endpoint apparatus 200 not illustrated in FIG. 2.

The transceiver 220 may perform a function of a physical layer of wired/wireless transmission/reception of data to/from other entities (e.g., another endpoint apparatus or server apparatus).

The memory 230 may store information generated or processed by the processor 210, software, operating system, application, or the like related to operations of the endpoint apparatus 200 and may include constituents such as a buffer or the like. Further, the memory 230 may store metadata including T-ID information according to the present disclosure. In addition, the memory 230 may include a storage (e.g., a hard disk, etc.) that may store an object temporarily or maintain an object. For example, an object stored in the memory 230 may include content data and metadata. Further, the memory 230 may store relationship information according to the present disclosure.

The user interface 240 may sense user's operation, input, or the like for the endpoint apparatus 200 and transfer them to the processor 210 or may output a processing result of the processor 210 in various ways that a user may recognize.

The processor 210 may include T-ID information update unit 211, metadata generation unit 212, and relationship information processing unit 213.

T-ID information update unit 211 may update T-ID information of an object when content of the corresponding object is changed. Additionally or alternatively, T-ID information update unit 211 may update T-ID information of an object when the corresponding object is saved. Specifically, T-ID information update unit 211 may update T-ID information of an object when the corresponding object is saved after the object is opened. More specifically, T-ID information update unit 211 may update T-ID information of an object when changed content of the corresponding object is saved after the content of the object is changed after the object is opened. Additionally or alternatively, T-ID information update unit 211 may update T-ID information when the corresponding object is saved, regardless of whether content of an object being changed (i.e., not only in case where the content of the object is changed but also in case where the content of the object is not changed). Hereinafter, a condition for an update of T-ID of an object will be referred to as a case where an object is changed/saved.

T-ID information of an object may be configured as a pair of a parent T-ID and a current T-ID.

In this case, T-ID information update unit 211 may newly assign a current T-ID when the object is changed/saved. A current T-ID of an object may be assigned as a unique identifier for a timepoint when the object is changed/saved. That is, a newly assigned value of a current T-ID may be a unique value distinguished from T-IDs of other objects.

A parent T-ID of an object may be assigned as a value identical to a value of a current T-ID of another object from which the object is derived. The above-described another object from which the object is derived may be a most recently saved version of the object. The above-described another object from which the object is derived may be referred to as a parent object of the object.

For example, when a user copies a first object as a second object and then changes/saves the second object, a value of a parent T-ID of the second object may be assigned identical to a value of a current T-ID of the first object. Additionally or alternatively, a value of a parent T-ID assigned when an object is changed/saved may be identical to a value of a current T-ID immediately before the object is changed/saved. That is, T-ID information update unit 211 may assign a value of a current T-ID at the time immediately before updating T-ID information of an object to a value of a parent T-ID at the time of updating T-ID information.

That is, among a parent T-ID and a current T-ID of an object in a state of being saved most recently, the current T-ID may be moved into the parent T-ID and a new current T-ID may be assigned, in case of changing/saving the object. For example, when a pair of a parent T-ID in a state of being saved most recently and a current T-ID of an object is {A, B}, the T-ID information update unit 211 may update the pair of T-IDs into {B, C} when the object is changed/saved. Thereafter, in case the object is copied, the copied object is opened and then additionally changed/saved, the pair of T-IDs may be updated into {C, D}.

In the above example, objects having the T-ID pairs of {A, B}, {B, C} and {C, D} may be respectively referred to as a first object, a second object and a third object, and the first object may correspond to a parent object of the second object, and the second object may correspond to a child object of the first object. In addition, the second object may correspond to a parent object of the third object, and the third object may correspond to a child object of the second object.

In case of an initially created object, the T-ID information update unit 211 may empty a parent T-ID or assign null to the parent T-ID, and may newly assign a unique value to a current T-ID.

In case where there are one or more timepoints at which an object is changed/saved between a timepoint at which the object is opened and a timepoint at which the object is closed, the T-ID information update unit 211 may update T-ID at the timepoint at which the object is initially changed/saved. That is, the T-ID information update unit 211 may update T-ID at a timepoint at which the object is initially changed/saved after the object is opened and may not update T-ID at other subsequent timepoints at which the object is changed/saved.

Here, a timepoint at which an object is closed may mean a timepoint at which the object is initially closed after the object is opened. For example, a procedure of opening and closing an object may be repeated a plurality of times, which may be expressed as a first opening-closing procedure, a second opening-closing procedure, a third opening-closing procedure, . . . . For example, T-ID may be updated when an object is changed/saved once in the first opening-closing procedure. In case where the object is not changed/saved in the second opening-closing procedure, T-ID may not be updated. In case where the object is changed/saved a plurality of times in the third opening-closing procedure, among the plurality of times of changing/saving, T-ID may be updated when the object is initially change/saved. That is, in each of opening-closing procedure, among one or more timepoints at which the object is changed/saved, T-ID may be updated at a timepoint at which the object is initially changed/saved.

T-ID information update unit 211 may update T-ID in case of "save-as" when an object is saved as a different name or location. That is, T-ID information update unit 211 may regard "save-as" as changing of content of an object and may update T-ID. When save-as occurs a plurality of times after an object is opened, T-ID may be updated at each of occurrence of save-as. Save-as corresponds to a case where a previous object is closed (i.e., a user does not manually close the object) without saving content, while a new object is opened and content of the new object is saved, so it may be interpreted that T-ID is updated at a timepoint at which an object is initially changed/save after the object is opened.

Here, when an operation of save-as is performed on an object, a current T-ID may be newly assigned as a unique identifier for an object created by the save-as operation. A parent T-ID of the object created by the save-as operation may be assigned a value equal to a current T-ID of the object immediately before the save-as operation.

When an object is created by copying another object, T-ID information update unit 211 may not update T-ID information of the copy. In addition, when an operation of rename is performed on an object, T-ID information update unit 211 may not update T-ID information. An operation of copy or rename may not correspond to a case where an object is opened or changed/saved, so T-ID information may not be updated. After an operation of copy or rename is performed on an object, when the copied or renamed object is opened and changed/saved, T-ID information update unit 211 may update T-ID information.

Metadata generation unit 212 may generate metadata based on T-ID information updated by T-ID information update unit 211.

The generated metadata may be transmitted to the server apparatus 330 through the transceiver 220. A timepoint at which metadata is transmitted to the server apparatus 300 may be immediately after updating T-ID information at T-ID information update unit 211. Additionally or alternatively, a timepoint at which metadata is transmitted to the server apparatus 300 may be after updating T-ID information and before closing an object, or after closing an object and before reopening the object.

In addition, metadata generation unit 212 may write metadata including updated T-ID information in an object. For example, when an object includes a header and a body, the body of the object may include contents data, and the header of the object may include metadata. A header may be an encrypted header. For example, when an object is changed/saved, an object editor (e.g., word processor, multimedia editor, etc.) may store metadata including T-ID information in an encrypted header using an injected module.

Metadata may further include C-ID of an object. C-ID may be assigned as a new value when an object is initially created, and the assigned C-ID may be maintained when the object is changed/saved.

In addition, metadata may include at least one object usage type (e.g., create, read, edit, print, etc.), current object name, original object name, object class, usage date and time, create time, last saved time, user name, user rank, owner name, owner identification information, creator name, creator identification information, system type, endpoint identification information, or department information. Such information may be utilized as reference information for object management and tracing using T-ID information according to the present disclosure.

Relationship information processing unit 213 may determine relationship among one or more objects belonging to a predetermined object group based on relationship information provided from the server apparatus 300. The object relationship determined based on relationship information may be displayed to a user through the user interface 240.

For example, an object group may include one or more objects assigned common C-ID. Object relationship among objects assigned common C-ID may include a content change history or a copy creation history, and the object relationship may be determined using relationship among T-ID information of each of the objects. Specifically, for a first object and a second object having common C-ID, a relationship between the first object and the second object may be determined by comparing a parent T-ID and a current T-ID of the first object with a parent T-ID and a current T-ID of the second object.

More specifically, it may be assumed that there are a first, second and third objects belonging to a same object group (i.e., assigned common C-ID). In displaying object relationship based on relationship information, a node may correspond to an object.

For example, when a current T-ID of the first object is identical to a parent T-ID of the second object, the second object may be displayed at a lower node of a node corresponding to the first object. When a current T-ID of the second object is identical to a parent T-ID of the third object, the third object may be displayed at a lower node of a node corresponding to the second object. Therefore, it may be estimated that the first, second and third objects have equivalent topics and content thereof have been changed sequentially. That is, when a plurality of nodes corresponding to a plurality of objects are displayed in linear nodes, the plurality of objects may be estimated that they have contents of equivalent topics.

For additional example, when a current T-ID of the first object is identical to a parent T-ID of the second object and the current T-ID of the first object is identical to a parent T-ID of the third object, a node corresponding to the first object may be displayed as a branching node having a node corresponding to the second object and a node corresponding to the third object as lower nodes. Accordingly, at least one of the second object and the third object may be estimated as being created as a copy of the first object. Further, it may be estimated that contents of the second object and the third object have different topics. That is, when a plurality of nodes corresponding to a plurality of objects are displayed in branched nodes, the objects corresponding to the plurality of nodes may be estimated that they have contents of different topics.

In addition, relationship information processing unit 213 may display entire relationship among one or more objects belonging to an object group through the user interface 240 and may also display a node corresponding to a specific object, some or all of higher nodes related to the node, and some or all of lower nodes related to the node. This may be useful for a user to search or trace an object corresponding to a specific current T-ID in an object group.

In addition, in displaying object relationship through the user interface 240, in a location related to a node corresponding to a specific object (e.g., in a form of expansion or pop-up in a vicinity of the node), information included in the metadata of the specific object may be displayed, such as at least one of object usage type, current object name, original object name, object class, usage date and time, create time, last saved time, user name, user rank, owner name, owner identification information, creator name, creator identification information, system type, endpoint identification information, or department information.

Relationship information processed by the relationship information processing unit 213 may be provided from the server apparatus 300 in response to a request from the endpoint apparatus 200. Additionally or alternatively, relationship information may be provided based on a determination of the server apparatus 300 without a request from the endpoint apparatus 200.

In addition, though the endpoint apparatus 200 has not updated T-ID information of an object or has not transmitted T-ID information of an object to the server apparatus 300, the endpoint apparatus 200 may receive relationship information of the object from the server apparatus 300 and may process the relationship information of the object. That is, an endpoint updating T-ID information and transmitting T-ID information to a server needs not to be the same as an endpoint receiving relationship information and displaying relationship among objects. Additionally or alternatively, the endpoint apparatus 200 may include a part of the T-ID information update unit 211, metadata generation unit 212 and relationship information processing unit 213.

A server apparatus 300 may include a processor 310, transceiver 320, memory 330 and user interface 340. The processor 310, transceiver 320, memory 330 and user interface 340 may transmit/receive data, request, response, command, or the like to/from each other through a bus or the like.

The processor 310 may control an operation of the transceiver 320, memory 330 and user interface 340. In addition, the processor 310 may control overall operations of the server apparatus 300 including other constituents of the server apparatus 300 not illustrated in FIG. 2.

The transceiver 320 may perform a function of a physical layer of wired/wireless transmission/reception of data to/from other entities (e.g., endpoint apparatus).

The memory 330 may store information generated or processed by the processor 310, software, operating system, application, or the like related to operations of the server apparatus 300 and may include constituents such as a buffer or the like. Further, the memory 330 may store metadata including T-ID information according to the present disclosure. Further, the memory 330 may store relationship information according to the present disclosure.

The user interface 340 may sense user's operation, input, or the like for the server apparatus 300 and transfer them to the processor 310 or may output a processing result of the processor 310 in various ways that a user may recognize.

The processor 310 may include metadata management unit 311 and relationship information management unit 312.

Metadata management unit 311 may manage metadata received through transceiver 320 from each of one or more endpoint apparatuses 200. Metadata may include T-ID information of an object updated by each of endpoint apparatus 200. Timepoints at which the server apparatus 300 receives metadata from a plurality of endpoints 200 may be the same or different.

Detailed descriptions of updating T-ID included in metadata, generating metadata and transmitting metadata are the same as descriptions related to the endpoint apparatus 200, and therefore the descriptions are omitted here.

Relationship information management unit 312 may generate relationship information on one or more objects based on metadata for the one or more objects received from one or more endpoint apparatuses 200. Relationship information management unit 312 may generate relationship information based on the latest metadata that have been received immediately before generating the relationship information. The relationship information may be generated for an object group including one or more objects having a common C-ID.

Relationship information management unit 312 may transmit the generated relationship information to each of one or more endpoint apparatuses 200 through the transceiver 320. For example, the server apparatus 300 may transmit the relationship information to an endpoint apparatus 200 when there is a request from the endpoint apparatus 200 or may transmit the relationship information to an endpoint apparatus 200 based on a determination of the server apparatus 300 without a request from the endpoint apparatus 200.

Detailed descriptions of relationship information based on T-ID are the same as descriptions related to the endpoint apparatus 200, and therefore the descriptions are omitted here.

Figure 3:
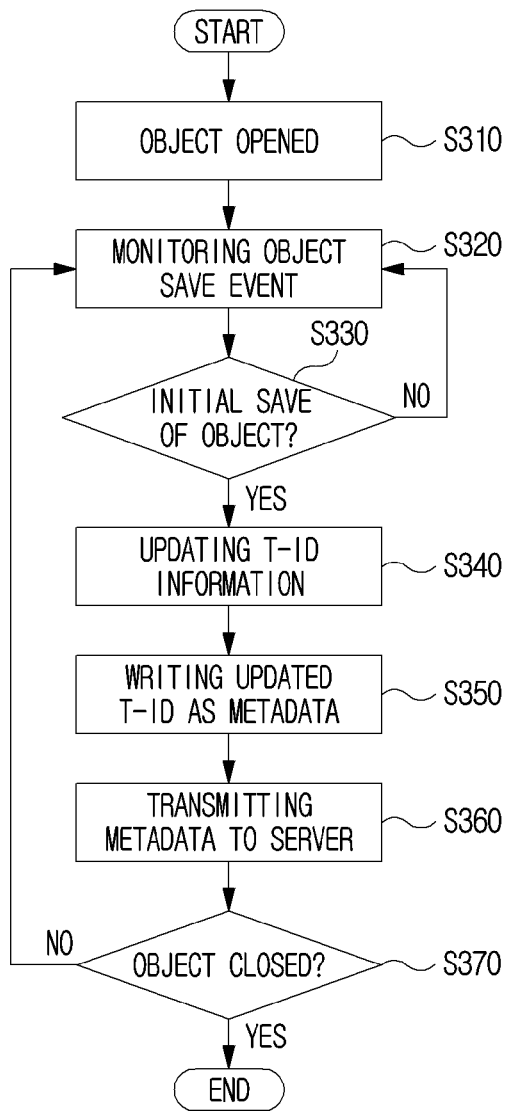
FIG. 3 is a flowchart illustrating an example of a method for managing an object according to the present disclosure.

FIG. 3 is a flowchart illustrating an example of a method for managing an object according to the present disclosure.

In step S310, an object may be opened at an endpoint.

In step S320, an operation of monitoring whether an object save event occurs at the endpoint may be performed.

In step S330, whether the object is initially saved at the endpoint may be determined. As described above, a save-as may be regarded as an initial save of an object.

When the object is initially saved, the next step may be step S340, and when the object is not yet saved or when it is not an initial save, the next step may be step S320.

In step S340, the endpoint may update T-ID information of the object. That is, the T-ID information may be updated when the corresponding object is saved.

Updating T-ID may include assigning a parent T-ID and a current T-ID. When a current T-ID exists immediately before the object is saved, a parent T-ID may be assigned a value identical to the current T-ID immediately before the object is saved. When the object is initially created and a current T-ID does not exist immediately before the object is saved, a parent T-ID may be left empty or assigned a null value. A current T-ID may be newly assigned a unique value at the time the object is saved.

In step S350, the endpoint may write the updated T-ID information as metadata. For example, the metadata including the updated T-ID information may be temporarily stored in a memory of the endpoint, and may be written in a region (e.g., a header region) different from content data of an object.

In step S360, the endpoint may transmit the metadata including the updated T-ID information to a server.

In step S370, whether the object is closed at the endpoint may be determined.

When the object is closed, the steps may be terminated, and when the object is not yet closed, the next step may be S320.

Figure 4:
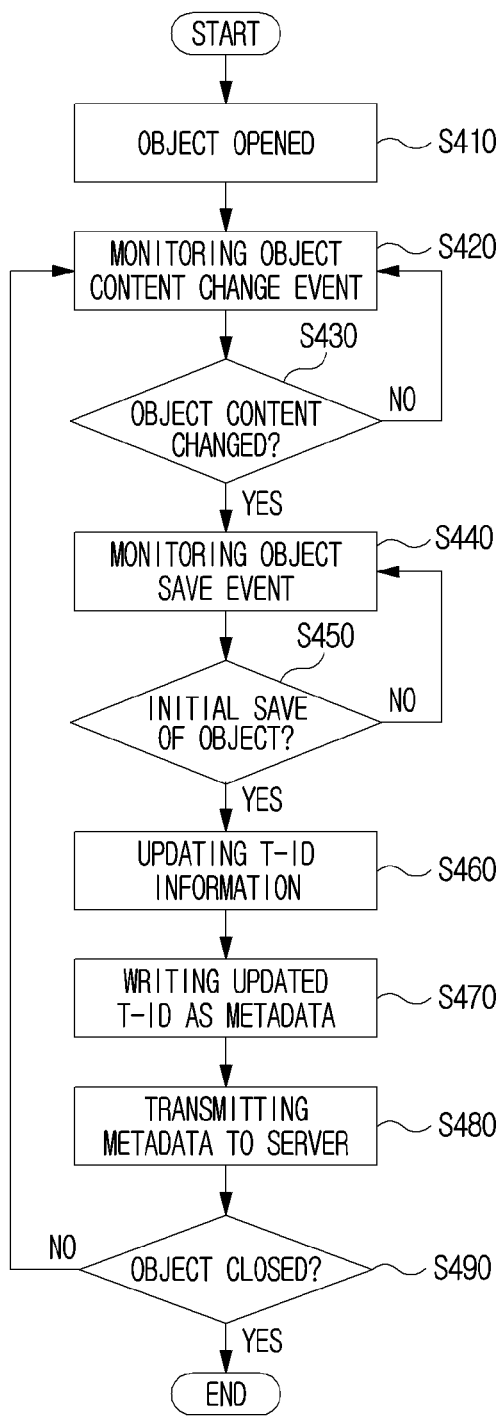
FIG. 4 is a flowchart illustrating an additional example of a method for managing an object according to the present disclosure.

FIG. 4 is a flowchart illustrating an additional example of a method for managing an object according to the present disclosure.

In step S410, an object may be opened at an endpoint.

In step S420, an operation of monitoring whether an object content change event occurs at the endpoint may be performed. The object content change may include adding content, replacing some or all of contents with new content, changing an order of contents, deleting some or all of contents, or the like.

In step S330, whether content of the object is changed at the endpoint may be determined.

When the content of the object is changed, the next step may be step S440, and when the content of the object is not changed, the next step may be step S420.

In step S440, an operation of monitoring whether an object save event occurs at the endpoint may be performed.

In step S450, whether the object is initially saved at the endpoint may be determined. As described above, a save-as may be regarded as an initial save of an object.

When the object is initially saved, the next step may be step S460, and when the object is not yet saved or when it is not an initial save, the next step may be step S420.

In step S460, the endpoint may update T-ID information of the object. That is, the T-ID information may be updated when content of the corresponding object is changed and the corresponding object is saved.

Depending on an operation scheme of an object editor, object save may be allowable only when there is a change in object content, or object save may be allowable regardless of whether the object content is changed. Therefore, according to the example of FIG. 4, updating T-ID of an object may be supported when object content is changed/saved.

Updating T-ID may include assigning a parent T-ID and a current T-ID. When a current T-ID exists immediately before the object is saved, a parent T-ID may be assigned a value identical to the current T-ID immediately before the object is saved. When the object is initially created and a current T-ID does not exist immediately before the object is saved, a parent T-ID may be left empty or assigned a null value. A current T-ID may be newly assigned a unique value at the time the object is saved.

In step S470, the endpoint may write the updated T-ID information as metadata. For example, the metadata including the updated T-ID information may be temporarily stored in a memory of the endpoint, and may be written in a region (e.g., a header region) different from content data of an object.

In step S480, the endpoint may transmit the metadata including the updated T-ID information to a server.

In step S490, whether the object is closed at the endpoint may be determined.

When the object is closed, the steps may be terminated, and when the object is not yet closed, the next step may be S420.

Figure 5:
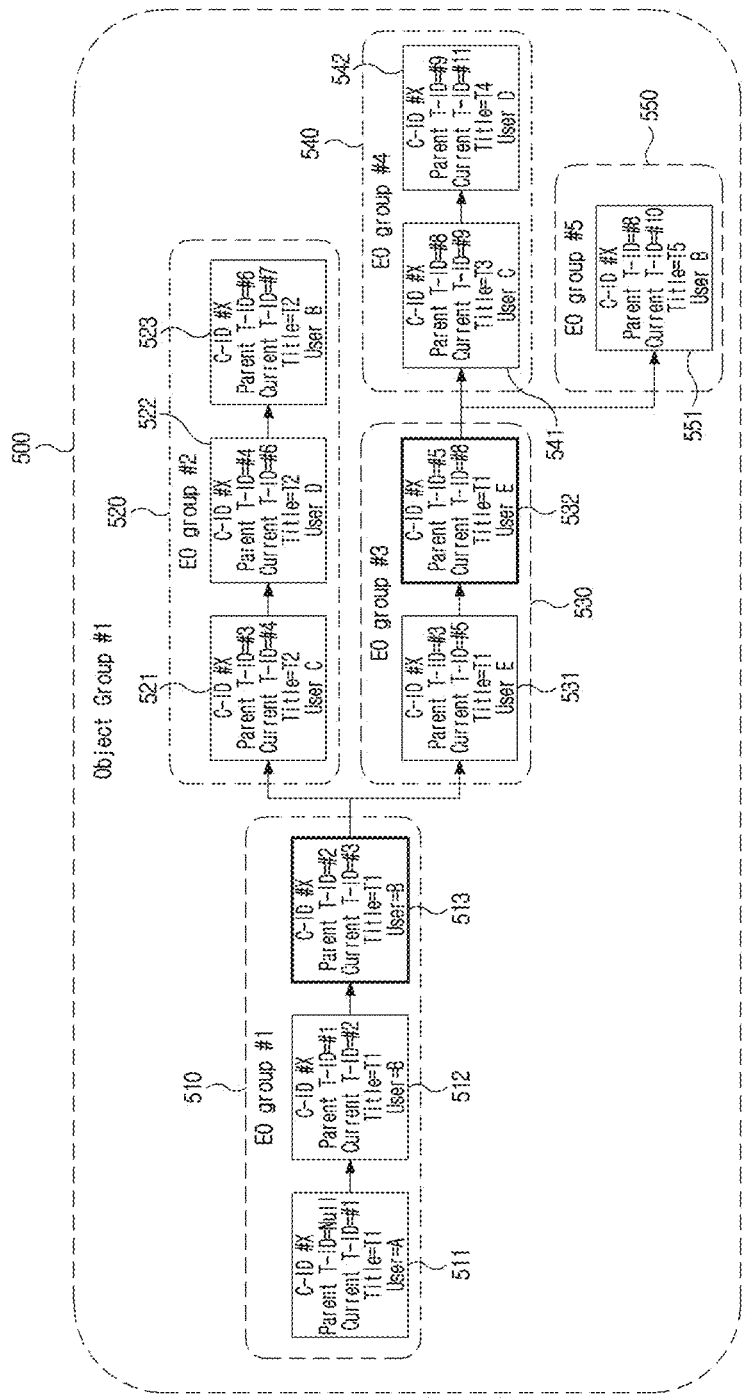
FIG. 5 is a diagram illustrating an example of displaying object relationship according to the present disclosure.

FIG. 5 is a diagram illustrating an example of displaying object relationship according to the present disclosure.

FIG. 5 illustrates an exemplary relationship among a plurality of objects included in one object group 500 in the form of a tree graph. The scope of the present disclosure is not limited to expressing an object relationship by a tree graph but includes expressing an object relationship in various ways such as a radial diagram, a time line diagram, and configuring relationship information for such expressions.

A server may configure relationship information based on the metadata including T-ID provided from an endpoint and may provide the relationship information to an endpoint. An endpoint may display object relationship as shown in FIG. 5 based on the relationship information provided from a server.

In FIG. 5, it may be assumed that all objects belonging to one object group 500 have a common C-ID (e.g., C-ID #X). A parent T-ID and a current T-ID assigned to each of the objects are assigned or updated upon change/save of the corresponding object and may be provided to a server.

A first object 511 is initially created by a user A, and a parent T-ID value is assigned as a null value and a current T-ID value is assigned as #1. A title of the first object may be assigned as T1.

A parent T-ID value of a second object 512 is #1, which is identical to the current T-ID value of the first object 511. Accordingly, the second object 512 may be estimated to be derived from the first object 511. A title of the second object 512 is maintained as T1, and the object has been changed/saved by a user B.

A parent T-ID value of a third object 513 is #2, which is identical to the current T-ID value of the second object 512. Accordingly, the third object 513 may be estimated to be derived from the second object 512. A title of the third object 513 is maintained as T1, and the object has been changed/saved by the user B.

When a plurality of nodes are linearly displayed in a graph indicating relationship information, a plurality of objects corresponding to the plurality of nodes may be estimated as an Equivalent Object (EO) group including contents of the equivalent topics. In the example of FIG. 5, the first to third objects 511, 512, and 513 may form an EO group #1.

Next, a parent T-ID value of a fourth object 521 is #3, which is identical to the current T-ID value of the third object 513. Accordingly, the fourth object 521 may be estimated to be derived from the third object 513. A title of the fourth object 521 is changed to T2, and the object is changed/saved by a user C.

A parent T-ID value of a fifth object 531 is #3, which is identical to the current T-ID value of the third object 513. Accordingly, the fifth object 531 may be estimated to be derived from the third object 513. A title of the fifth object 531 is maintained as T1, and the object has been changed/saved by a user E.

In this case, nodes corresponding to the fourth object 521 and the fifth object 531 may be displayed in branches from the node corresponding to the third object. For example, it may be estimated that the fourth object 521 corresponds to an object changed/saved after the third object 513 is opened, and the fifth object 531 corresponds to an object opened and changed/saved after being copied from the third object 513 or corresponds to an object created by a save-as operation. For example, it may be estimated that the fourth object 521 corresponds to an object opened and changed/saved after being copied from the third object 513 or corresponds to an object created by a save-as operation, and the fifth object 531 corresponds to an object changed/saved after the third object 513 is opened. For example, it may be estimated that each of the fourth object 521 and the fifth object 531 corresponds to an object opened and changed/saved after being copied from the third object 513 or corresponds to an object created by a save-as operation. Thus, when the fourth object 521 and the fifth object 531 are branched from the third object 513, it may be estimated that the fourth object 521 and the fifth object 531 include contents of different topics.

The fourth object 521, a sixth object 522 and a seventh object 523 are changed/saved in an order of users C, D and B, and the title is maintained as T1. Since the fourth object 521, the sixth object 522 and the seventh object 523 are linearly displayed, it may be estimated that they form an EO group #2 including equivalent contents.

The fifth object 531 and an eighth object 532 are changed/saved by a user E. Since the fifth object 531 and the eighth object 532 are linearly displayed, it may be estimated that they form an EO group #3 including the equivalent contents.

A ninth object 541 and a tenth object 551 are displayed in branches from the eighth object 532, it may be estimated that they include contents of different topics.

The ninth object 541 and an eleventh object 542 are changed/saved in an order of the users C and D, and the title is from T3 to T4. Since the ninth object 541 and the eleventh object 542 are linearly displayed, it may be estimated that they form an EO group #4 including equivalent contents.

The tenth object 551 is an object changed/saved by the user B, and the title is changed to T7. The tenth object 551 alone may form an EO group #5.

For example, the first to eleventh objects 511, 512, 513, 521, 531, 522, 523, 541, 551, and 542 may be assigned current T-ID values #1, #2, #3, #4, #5, #6, #7, #8, #9, #10, and #11 according to an order of timepoints of being changed/saved. However, the scope of the present disclosure is not limited thereto, and a current T-ID value of each object may be assigned a unique value distinguishable from T-IDs of other objects to provide sufficient object traceability.

In addition, in the example of FIG. 5, it may be assumed that only the first to fourth objects 511, 512, 513, and 521 are created before the fifth object 522 is created. In this case, the first to fourth objects 511, 512, 513, and 521 may be linearly displayed. At the corresponding timepoint, the first to fourth objects 511, 512, 513, and 521 may be assumed to have contents of equivalent topics.

For example, it may be assumed that, after the user C copies the third object 513 including content with a topic of "product introduction" using a file manager, opens the copied object and changes the content to a new topic of "travel plan", and then saves the edited object as the fourth object 521. In this case, even though the contents of the fourth object 521 and the third object 513 actually have different topics, the first to fourth objects 511, 512, 513, and 521 are linearly displayed, so it may be estimated that the first to fourth objects 511, 512, 513, and 521 have contents of equivalent topics.

Thereafter, it may be assumed that, after the user E downloads the third object 513 including the content with the topic of "product introduction" through an e-mail, opens the downloaded object and adds some content, and then saves the edited object as the fifth object 531. In this case, a new branch may be formed from the third object 513 at the timepoint at which the fifth object 531 is changed/saved. Accordingly, it may be estimated that the fourth object 521 and the fifth object 531 have contents of different topics.

Therefore, when displaying relationship among objects based on relationship information configured based on T-ID information of the objects, it may be estimated that a linear section forms an object group of equivalent topics, and a copy of a new topic is created in a branch section. In addition, a last object of the linear section may be estimated to be a most recent version among the objects of the corresponding topic.

Thus, by displaying relationship among objects based on relationship information of the objects, an object traceability for estimating a content change history among objects belonging to an object group having a specific C-ID, a collaboration history among users, a copy creation history, or the like may be provided.

In addition, an object relationship may be displayed with focusing on an object corresponding to a specific current T-ID. In this case, an object having the specific current T-ID value may be searched among entire objects, and other objects related to the retrieved object may be displayed. Accordingly, it may be estimated that which object the retrieved object is derived from, which object has the equivalent topic as the retrieved object, which object has a different topic from the retrieved object, whether the content is additionally changed after the retrieved object, whether there is a copy creation history after the retrieved object, or the like.

For example, when a search operation is performed based on the current T-ID #4, the fourth object 521 may be retrieved and it may be estimated that, among objects (i.e., objects belonging to the EO group #2) including contents of topics equivalent to that of the fourth object 521, the seventh object 523 corresponds to the most recent version, and that the contents are changed by the users D and B. In addition, it may be estimated that other objects not belonging to the EO group #2 have contents of topics different from that of fourth object 521.

In addition, even in case of objects belonging to different EO groups, it may be estimated that objects having a linear relationship with a specific object have contents or formats similar to that of the specific object. For example, it may be estimated that at least a portion of the content of the ninth object 541 is the same as or similar to those of the first, second, third, fifth, and eighth objects 511, 512, 513, 531, and 532. For example, it may be estimated that the format of the ninth object 541 is the same as or similar to those of the first, second, third, fifth, and eighth objects 511, 512, 513, 531, and 532.

In addition, in case of displaying object relationship with focusing on an object corresponding to a specific current T-ID, a branching node may be displayed in a collapsed form and a linear nodes section may be displayed in a timeline form. Also, it may be allowable to select the collapsed branching node to display other nodes branched from the selected node in an expanded form. Here, the collapsed node may correspond to being displayed as a representative of a plurality of EO groups branched from the corresponding node.

In addition, in displaying object relationship, the highest node of an EO group may be displayed as a representative of the EO group, or the lowest node (i.e., an object of the most recent version) of an EO group may be displayed as a representative of the EO group. For example, the EO group #2 may be displayed as one collapsed node, the fourth object 521 may be displayed as a collapsed node representing up to the sixth and seventh objects 522 and 523, or the seventh object 523 may be displayed as a collapsed node representing up to the fourth and sixth objects 521 and 522. Also, it may be allowable to select the collapsed representative node to display all nodes of the EO group including the selected node in an expanded form.

In addition, a leakage route of a specific object may be estimated by displaying object relationship. For example, when it is specified that the ninth object 541 is leaked, it may be estimated that the user C who changed/saved the corresponding object is involved in the object leakage, or the users E and D who changed/saved the objects of the higher node and lower node of the corresponding object are involved in the object leakage.

FIGS. 6 and 7 are diagrams illustrating an example of an object tracing scenario according to the present disclosure.

The object relationship graphs 600 exemplarily shown in FIG. 6 and FIG. 7 may correspond to results of search that a user at an endpoint selects a T-ID as an object tracing option and inputs a specific T-ID.

In addition, a user may set an object tracing option based on at least one of object usage type, current object name, original object name, object class, usage date and time, create time, last saved time, user name, user rank, owner name, owner identification information, creator name, creator identification information, system type, endpoint identification information, or department information, or a combination of two or more thereof.

When searching for an object based on T-ID, a list of objects including the corresponding T-ID may be provided. For example, an object having a parent T-ID identical to the T-ID inputted by the user and an object having a current T-ID identical to the T-ID inputted by the user may be specified. When the user inputs only a part of the T-ID (e.g., assuming that a format of T-ID is a length 10 of a combination of numbers and characters, when the inputted T-ID has a length less than 10), a list of objects including the inputted T-ID may be provided to the user. The list of objects may include information such as T-ID, object name, original object name, usage date and time, or the like. The user may select one object from a list of objects resulting from the search based on T-ID as a target object.

When the target object is specified based on the T-ID, an object relationship graph including the target object may be displayed as shown in FIG. 6.

In the example of FIG. 6, a node 620 corresponding to a target object retrieved based on T-ID and a relationship graph 600 of nodes corresponding to objects related to the target object are displayed.

When a user indicates (or overlaps a pointer to) a node corresponding to an object among the object relationship graph, a current T-ID value of the corresponding object may be displayed in a vicinity of the node. In the example of FIG. 6, it is shown that, when the user indicates the target object node 620, a corresponding T-ID value is displayed in the vicinity of the node.

For example, the object corresponding to the target object node 620 may be a document named "Proposal1.xls". The target object node 620 is displayed as an extended node, which means that the lower nodes 630 and 640 are displayed in a branched form from the node 620. Also, the higher node 610 of the target object node 620 may correspond to the highest node (or a root node) of objects having the same C-ID.

In addition, in the example of FIG. 6, the node 650 is displayed as a collapsed node, which means that there exists a lower node branched from the node 650 but is not displayed.

In the example of FIG. 6, when the user commands expansion of the collapsed node 650, a branch section including the lower nodes 660 and 670 branching from the node 650 may be displayed as in the example of FIG. 7.

In the example of FIG. 7, when the user indicates (or overlaps a pointer to) a newly displayed node 670, it is shown that a current T-ID value of the corresponding object is displayed in a vicinity of the node.

In addition, depending on the user's manipulation, a certain section including some nodes among the object relationship graph may be displayed, or a specific linear section (or an EO group) or a specific branch section may be displayed.

In addition, the user may select one or more nodes in the object relationship graph to identify T-ID information of one or more objects corresponding to the selected one or more nodes. Accordingly, the user may identify and collect the T-ID information of the object(s) of interest, and based on that, the user may perform additional object tracing.

FIG. 8 is a diagram illustrating an additional example of displaying object relationship according to the present disclosure.

FIG. 8 shows an example of displaying a target object retrieved based on T-ID and objects related to the target object in a timeline form.

An object timeline may basically display a target object and an object (i.e., a parent object) corresponding to a higher node of the target object. In addition, by moving the timeline (e.g., by dragging a pointer by a user), additional nodes may be newly displayed in a direction towards a parent node or a child node of the currently displayed node.

When a user indicates (or overlaps a pointer to) a node corresponding to an object displayed in the object timeline, a current T-ID value of the object may be displayed in a vicinity of the node.

In the example of a timeline of FIG. 8, a target object node 820 and a parent object node 810 are displayed basically. The parent object node 810 may be displayed with an icon 830 indicating that it is a collapsed branching node and there exist N (N is 4 in the example of FIG. 8) lower nodes of the collapsed branching node.

When the user selects a specific node, information related to the object corresponding to the selected node may be additionally displayed. The information related to the object may include at least one of object usage type, current object name, original object name, object class, usage date and time, create time, last saved time, user name, user rank, owner name, owner identification information, creator name, creator identification information, system type, endpoint identification information, or department information, or a combination of two or more thereof.

In the example of FIG. 8, an object usage event 840 may additionally be displayed in the timeline. Specifically, a type, frequency, timepoint, number of times, or the like of the object usage event 840 may be displayed in the timeline.

The usage event of an object may not correspond to a change/save processing operation related to updating T-ID of an object according to the present disclosure, but may correspond to an event such as an object creation, authority change, read, encryption, decryption, system encryption, system decryption, batch encryption, batch decryption, watermark print, print, discard, document class change, temporary file recovery, owner change, or the like.

When the user indicates (or overlaps a pointer to) a specific usage event, abstract information of the usage event may be displayed in a vicinity. The abstract information of the usage event may include a cumulative user associated with the corresponding event and a cumulative number of events.

When the user selects a specific usage event, information related to the selected usage event may be additionally displayed. The information related to the usage event may include at least one of detailed item of usage type, usage frequency, usage time, or user identifier.

In addition, in case of searching object based on T-ID and displaying object relationship in a timeline form, search options may be set based on object usage period, object usage event, user, or the like.

FIG. 9 is a diagram illustrating an additional example of displaying object relationship according to the present disclosure.

In the example of FIG. 9, it is shown that an object relationship is displayed in a radial graph. The radial graph may express an object relationship similarly to the tree graphs of FIGS. 6 and 7 but may be used to express a relationship among a large number of objects at one time.

From the object relationship graph shown in FIG. 9, a root object may correspond to an object initially created in a group of objects having a common C-ID. In FIG. 9, it is shown that the root object node is displayed as an expanded node, and some of the lower nodes are displayed as collapsed nodes.

In FIG. 9, a target object node may correspond to one of a plurality of objects branched from a parent object node. In addition, the target object is changed/saved from the root object through several branches, so that it may be identified that there exist a plurality of versions of objects having similar contents or formats.

In addition, when displaying an object relationship in a radial graph, it may be difficult to identify a parent node related to the target object and a further parent node of the parent node at a glance. Therefore, a series of parent-child node relationship having the target object as a final child node may be displayed in a distinguishable manner as compared to connection lines of other nodes.

In addition, depending on the user's manipulation, a certain section including some nodes among the object relationship graph may be displayed, or a specific linear section (or an EO group) or a specific branch section may be displayed.

According to various embodiments of the present disclosure described above, by updating T-ID when an object is changed/saved, without personally recording an intention of changing or saving the object or a relationship with another object by a user, object traceability of tracing a relationship among objects according to a content change history or a copy creation history of an object in a simple manner may be provided.

In addition, relationship information among objects may be managed by collecting metadata including T-ID information at a server, a relationship among objects may be displayed based on the relationship information at an endpoint, so that a change of an object, a leakage route of an object, or the like may be easily grasped from a relationship among objects in a linear section or a branch section.

Although the exemplary methods of this disclosure are represented by a series of steps for clarity of explanation, they are not intended to limit the order in which the steps are performed, and if necessary, each step may be performed simultaneously or in a different order. In order to implement the method according to the present disclosure, other steps may be included to the illustrative steps additionally, exclude some steps and include remaining steps, or exclude some steps and include additional steps.

The various embodiments of the disclosure are not intended to be exhaustive of all possible combination, but rather to illustrate representative aspects of the disclosure, and the features described in the various embodiments may be applied independently or in a combination of two or more.

In addition, various embodiments of the present disclosure may be implemented by hardware, firmware, software, or a combination thereof. A case of hardware implementation may be performed by one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, or the like.

The scope of the present disclosure is to encompass software or machine-executable instructions (e.g., operating system, applications, firmware, instructions, or the like) by which operations according to method of various embodiments are executed on a device or a computer, and non-transitory computer-readable media executable on the device or the computer, on which such software or instructions are stored.

INDUSTRIAL APPLICABILITY

Embodiments of the present disclosure may be applied to various object management methods and apparatuses in various computing environments.

The invention claimed is:

1. A method for managing an object using a trace-identifier (T-ID), by an endpoint device, the method comprising:
monitoring whether at least one save-event for the object occurs after the object is opened and before the object is closed at an endpoint,
updating, by a processor of the endpoint device, T-ID information for the object at a timepoint at which the object is initially saved, for both i) a number of the save-event between a timepoint at which the object is opened and a timepoint at which the object is closed being one, and ii) the number of the save-event between the timepoint at which the object is opened and the timepoint at which the object is closed being two or more at the endpoint,
wherein for ii) the number of the save-event between the timepoint at which the object is opened and the timepoint at which the object is closed being two or more, the T-ID information for the object is maintained without updating the T-ID information at one or more additional timepoints at which the object is saved between the timepoint at which the object is opened and the timepoint at which the object is closed at the endpoint; and
wherein, after the T-ID information for the object is updated at the timepoint at which the object is initially saved, the T-ID information for the object is maintained without updating the T-ID information for both iii) content of the object being changed one or more times after the timepoint at which the object is initially saved, and iv) the content of the object not being changed after the timepoint at which the object is initially saved, between the timepoint at which the object is opened and the timepoint at which the object is closed at the endpoint;
writing, by the processor, the updated T-ID information as metadata of the object to a memory of the endpoint device; and
transmitting, by the processor through a transceiver of the endpoint device, only the metadata including the T-ID information to a server, without transmitting the object or the content of the object,
wherein the object is an electronic file including the content.

2. The method according to claim 1, further comprising:
monitoring whether at least one content-change-event for the object occurs after the object is opened and before the object is closed,
wherein the monitoring whether at least one save-event for the object occurs is performed when the content-change-event for the object occurs,
wherein the updating T-ID information further comprises:
after the content-change-event occurs, updating, by the processor, the T-ID information for the object at the timepoint at which the object is initially saved.

3. The method according to claim 1,
wherein the updating T-ID information further comprises:
regardless of whether content of the object is changed, updating, by the processor, the T-ID information for the object at the timepoint at which the object is initially saved.

4. The method according to claim 1,
wherein the updating T-ID information further comprises:
assigning, by the processor, a pair of a parent T-ID and a current T-ID of the object.

5. The method according to claim 4,
wherein the current T-ID is newly assigned as a unique identifier for the object at the timepoint at which the object is initially saved.

6. The method according to claim 4,
wherein the parent T-ID corresponds to a current T-ID of the object immediately before updating the T-ID information.

7. The method according to claim 4,
when the object is an initially created object, the parent T-ID is assigned a null value.

8. The method according to claim 1,
wherein the updating T-ID information further comprises:
updating, by the processor, the T-ID information for the object at each of one or more timepoints at which a save-as operation is performed on the object after the object is opened.

9. The method according to claim 1,
wherein the metadata further include a content-identifier (C-ID) of the object,
wherein the C-ID is newly assigned when the object is an initially created object, and
wherein the C-ID is maintained when the C-ID is previously assigned for the object.

10. A method for tracing an object using a trace-identifier (T-ID), by an endpoint device, the method comprising:
receiving, by a processor of the endpoint device through a transceiver of the endpoint device from a server, relationship information indicating relationship among one or more objects based on T-ID information of each of the one or more objects, for an object group including the one or more objects assigned a common C-ID; and
displaying, at the endpoint device by the processor, relationship among the one or more objects based on the relationship information,
wherein whether at least one save-event for the object occurs after the object is opened and before an object is closed is monitored at the endpoint or at each of one or more other endpoints, T-ID information for the object is updated at a timepoint at which the object is initially saved, for both i) a number of the save-event between a timepoint at which the object is opened and a timepoint at which the object is closed being one, and ii) the number of the save-event between the timepoint at which the object is opened and the timepoint at which the object is closed being two or more at the endpoint or at each of the one or more other endpoints,
wherein for ii) the number of the save-event between the timepoint at which the object is opened and the timepoint at which the object is closed being two or more, the T-ID information for the object is maintained without updating the T-ID information at one or more additional timepoints at which the object is saved between the timepoint at which the object is opened and the timepoint at which the object is closed at the endpoint, and
wherein, after the T-ID information for the object is updated at the timepoint at which the object is initially saved, the T-ID information for the object is maintained without updating the T-ID information for both iii) content of the object being changed one or more times after the timepoint at which the object is initially saved, and iv) the content of the object not being changed after the timepoint at which the object is initially saved, between the timepoint at which the object is opened and the timepoint at which the object is closed at the endpoint,
wherein only metadata including the updated T-ID information without the object of content of the object is transmitted to the server, and
wherein the object is an electronic file including the content.

11. The method according to claim 10,
wherein the displaying further comprises:
wherein, for first, second, and third objects belonging to the object group,
when a current T-ID of the first object is identical to a parent T-ID of the second object, the second object is displayed by the processor at a lower node of a node corresponding to the first object,
when a current T-ID of the second object is identical to a parent T-ID of the third object, the third object is displayed by the processor at a lower node of a node corresponding to the second object.

12. The method according to claim 10,
wherein the displaying further comprises:
wherein, for first, second, and third objects belonging to the object group,
when a current T-ID of the first object is identical to a parent T-ID of the second object and the current T-ID of the first object is identical to a parent T-ID of the third object, a node corresponding to the first object is displayed by the processor as a branching node having lower nodes including a node corresponding to the second object and a node corresponding to the third object.

13. The method according to claim 12,
wherein the branching node corresponding to the first object is displayed in an expanded form or a collapsed form.

14. The method according to claim 10,
wherein, when a plurality of nodes are linearly displayed, objects corresponding to the plurality of nodes are estimated to have contents of equivalent topics,
wherein, when a plurality of nodes are displayed in branches from a higher node, objects corresponding to the plurality of nodes are estimated to have contents of different topics.

15. The method according to claim 10,
wherein the displaying further comprises:
displaying, by the processor, a node corresponding to a specific object retrieved based on a specific current T-ID.

16. A method for managing an object using a trace-identifier (T-ID) by a server, the method comprising:
receiving, by a processor of the server through a transceiver of the server, from one or more endpoints, only metadata including T-ID information for each of one or more objects, without receiving transmitting the one or more objects or content of the one or more objects; and
generating, by the processor, information indicating relationship among the one or more objects based on the T-ID information for the each of the one or more objects, for an object group including the one or more objects, and
transmitting, by the processor, the generated information to the one or more endpoints or one or more other endpoints,
wherein, for the T-ID information for the each of the one or more objects, whether at least one save-event for an object occurs after the object is opened and before the object is closed is monitored at each of the one or more endpoints, T-ID information for the object is updated at a timepoint at which the object is initially saved, for both i) a number of the save-event between a timepoint at which the object is opened and a timepoint at which the object is closed being one, and ii) the number of the save-event between the timepoint at which the object is opened and the timepoint at which the object is closed being two or more at each of the one or more endpoints,
wherein for ii) the number of the save-event between the timepoint at which the object is opened and the timepoint at which the object is closed being two or more, the T-ID information for the object is maintained without updating the T-ID information at one or more additional timepoints at which the object is saved between the timepoint at which the object is opened and the timepoint at which the object is closed at the endpoint, and
wherein, after the T-ID information for the object is updated at the timepoint at which the object is initially saved, the T-ID information for the object is maintained without updating the T-ID information for both iii) content of the object being changed one or more times after the timepoint at which the object is initially saved, and iv) the content of the object not being changed after the timepoint at which the object is initially saved, between the timepoint at which the object is opened and the timepoint at which the object is closed at the endpoint,
wherein the updated T-ID information is written as metadata for the object, and
wherein the object is an electronic file including content.

* * * * *